(12) United States Patent
      Stock et al.

(10) Patent No.: US 12,700,320 B2
(45) Date of Patent: Aug. 4, 2026

(54) RUNWAY INCURSION DETECTION

(71) Applicant: The Boeing Company, Arlington, VA (US)

(72) Inventors: Zachary P. Stock, Camano Island, WA (US); Hannah G. Gillespie, Seattle, WA (US); Nick S. Evans, Lynnwood, WA (US)

(73) Assignee: The Boeing Company, Arlington, VA (US)

( * ) Notice: Subject to any disclaimer, the term of this patent is extended or adjusted under 35 U.S.C. 154(b) by 107 days.

(21) Appl. No.: 18/484,855

(22) Filed: Oct. 11, 2023

(65) Prior Publication Data

US 2025/0124796 A1      Apr. 17, 2025

(51) Int. Cl.
*G08G 5/02* (2006.01)
*G05D 1/00* (2006.01)
(Continued)

(52) U.S. Cl.
CPC ............ *G08G 5/54* (2025.01); *G05D 1/0278* (2013.01); *G06V 10/70* (2022.01); *G06V 20/17* (2022.01);
(Continued)

(58) Field of Classification Search
CPC .. G08G 5/54; G08G 5/51; G08G 5/56; G08G 5/57; G08G 5/70; G08G 5/72; G08G 5/80;
(Continued)

(56) References Cited

U.S. PATENT DOCUMENTS 6,191,751 B1 * 2/2001 Johnson .............. H01Q 1/3291
                                                    343/834
7,605,688 B1 * 10/2009 Seah ....................... G01S 13/91
                                                    340/972
(Continued)

FOREIGN PATENT DOCUMENTS

CN         212899508 U  *  4/2021
CN         114422067 A  *  4/2022  ........... H04B 10/118
(Continued)

OTHER PUBLICATIONS

"Statellite Navigation", Mar. 1, 2023, Federal Aviation Administration (Year: 2023).*
(Continued)

*Primary Examiner* — Erin M Piateski
*Assistant Examiner* — Ashley Tiffany Schoech
(74) *Attorney, Agent, or Firm* — Yee & Associates, P.C.

(57) ABSTRACT

An airport object location system comprising a number of vehicle location units, a sensor system, and a model generator. The number of vehicle location units is connected to a number of vehicles. The number of vehicle location units generate vehicle location information for the number of vehicles in an area including an operations surface at an airport and vehicle timestamps for the vehicle location information. The sensor system is connected to a reference vehicle. The sensor system is configured to generate sensor data for the area, wherein reference timestamps and reference location information are associated with the sensor data. The model generator is configured to correlate the vehicle location information for the vehicles with the sensor data using the vehicle timestamps, the reference location information, and the reference timestamps to form a dataset.

35 Claims, 13 Drawing Sheets

(51) Int. Cl.

| | | |
|---|---|---|
| *G05D 1/02* | (2020.01) | |
| *G06V 10/70* | (2022.01) | |
| *G06V 20/17* | (2022.01) | |
| *G06V 20/40* | (2022.01) | |
| *G08G 5/00* | (2025.01) | |
| *G08G 5/04* | (2006.01) | |
| *G08G 5/21* | (2025.01) | |
| *G08G 5/54* | (2025.01) | |
| *G08G 5/80* | (2025.01) | |
| *H01Q 1/32* | (2006.01) | |

(52) U.S. Cl.
CPC .............. *G06V 20/46* (2022.01); *G08G 5/21* (2025.01); *G08G 5/80* (2025.01); *H01Q 1/3233* (2013.01); *H01Q 1/325* (2013.01)

(58) Field of Classification Search
CPC .. G08G 5/21; G08G 5/22; G08G 5/26; G08G 5/723; G08G 5/727; G06V 10/70; G06V 10/74; G06V 20/17; G06V 20/46; G06V 20/40; G06V 10/80; G06V 10/77; G06V 20/10; G06V 20/58; B60W 2556/50; B64U 2201/00; B60R 2300/302; H01Q 1/3233; H01Q 1/32; H01Q 1/325; H01Q 1/3275; H01Q 1/3291
See application file for complete search history.

(56) References Cited

U.S. PATENT DOCUMENTS

| | | | | |
|---|---|---|---|---|
| 10,822,773 | B2 * | 11/2020 | Shike | G07C 5/008 |
| 2008/0100528 | A1 * | 5/2008 | Noro | H01Q 9/0407 |
| | | | | 343/872 |
| 2010/0315301 | A1 * | 12/2010 | Marten | H01Q 21/06 |
| | | | | 174/59 |
| 2011/0279337 | A1 * | 11/2011 | Corwin | H01Q 1/1221 |
| | | | | 343/906 |
| 2019/0364387 | A1 * | 11/2019 | Mian | G06V 20/17 |
| 2021/0227447 | A1 * | 7/2021 | Yates | H04W 40/20 |
| 2022/0101736 | A1 * | 3/2022 | Maloney | G07C 5/0808 |
| 2022/0238031 | A1 * | 7/2022 | Evans | G06V 10/25 |
| 2022/0353697 | A1 * | 11/2022 | Saha | H04B 7/086 |

| | | | | |
|---|---|---|---|---|
| 2023/0178881 | A1 * | 6/2023 | Lee | H01Q 1/362 |
| 2023/0281975 | A1 * | 9/2023 | Nacsa | G06V 10/776 |
| | | | | 382/103 |
| 2023/0340987 | A1 * | 10/2023 | Aggarwal | F16M 13/022 |
| 2024/0288282 | A1 * | 8/2024 | Aboussouan | G01S 17/89 |
| 2024/0363012 | A1 * | 10/2024 | Dy | G08G 5/22 |

FOREIGN PATENT DOCUMENTS

| | | | | | |
|---|---|---|---|---|---|
| CN | 219284301 | U | * | 6/2023 | |
| EP | 0613111 | A1 | * | 8/1994 | G08G 5/0026 |
| JP | H1056310 | A | * | 2/1998 | |
| KR | 20140122939 | A | * | 10/2014 | G01S 19/38 |
| WO | WO-03069731 | A1 | * | 8/2003 | H01Q 13/20 |
| WO | WO-2013140603 | A1 | * | 9/2013 | H02G 3/083 |

OTHER PUBLICATIONS

"PPC-1000", Sep. 17, 2019, CMS, https://web.archive.org/web/20190917203745/http://www.ipctechnology.com/products/panel-computer/panel-pc-ppc1000/panel-pc-ppc1000-P4IO.htm (Year: 2019).*

Nicolas Nova, "Intriguing Toys, an LBS for kids", Dec. 24, 2005, https://www.nicolasnova.net/pasta-and-vinegar/2005/12/24/intriguing-toys-an-lbs-for-kids (Year: 2005).*

"Pelican Case Services", Feb. 1, 2023, DataPro, https://web.archive.org/web/20230201225234/http://www.datapro.net/help/pelican_case_services.html (Year: 2023).*

Plum Laboratories, "Plum Portable Broadband Kit Use Cases", Mar. 7, 2022, YouTube, https://www.youtube.com/watch?v=jEP3v-GO50w (Year: 2022).*

European Patent Office Extended Search Report, dated Mar. 17, 2025, regarding Application No. EP24202380.2, 13 pages.

Jiang et al., Comparison of Detection Technology for Runway Incursion Prevention in Airport Hot Spot, Journal of Physics: Conference Series, 3rd International Conference on Advanced Algorithms and Control Engineering (ICAACE), vol. 1570, Apr. 24-26, 2020, Zhangjiajie, China, 9 pages.

Chen et al., "Mitigation of Runway Incursions by Using a Convolutional Neural Network to Detect and Identify Airport Signs and Markings," Sensors and Materials, vol. 31, No. 12, 2019, pp. 3947-3958, semanticscholar.org, accessed Jun. 9, 2025, https://pdfs.semanticscholar.org/915f/f147e260cb6851422a8d2ceaa22504ed3fad.pdf.

* cited by examiner

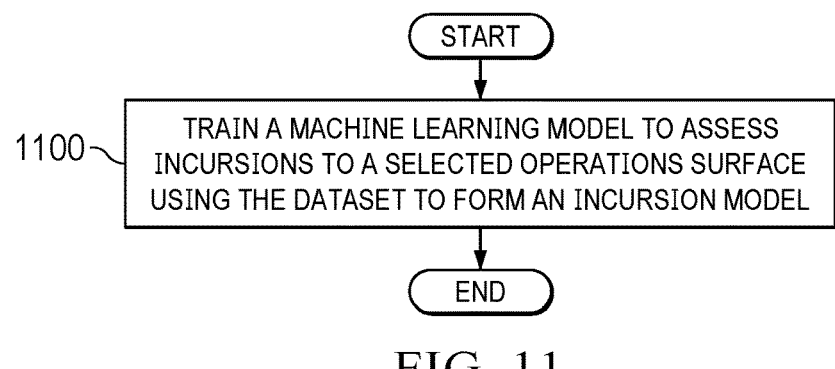

1100 — TRAIN A MACHINE LEARNING MODEL TO ASSESS INCURSIONS TO A SELECTED OPERATIONS SURFACE USING THE DATASET TO FORM AN INCURSION MODEL

FIG. 11

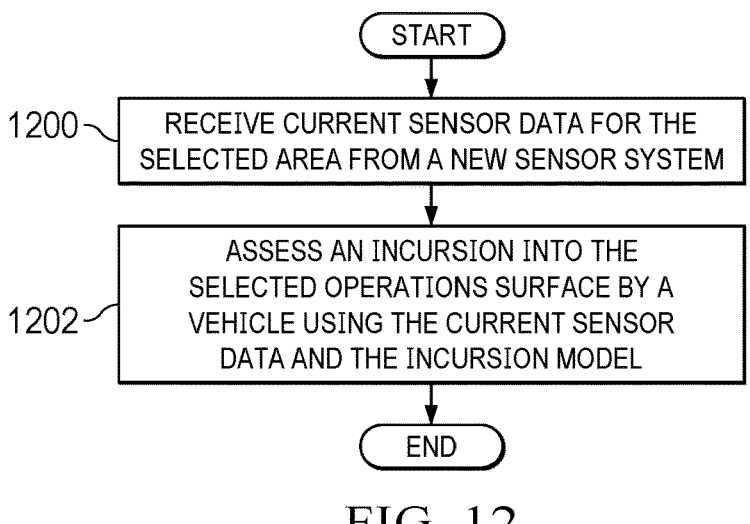

1200 — RECEIVE CURRENT SENSOR DATA FOR THE SELECTED AREA FROM A NEW SENSOR SYSTEM

1202 — ASSESS AN INCURSION INTO THE SELECTED OPERATIONS SURFACE BY A VEHICLE USING THE CURRENT SENSOR DATA AND THE INCURSION MODEL

FIG. 12

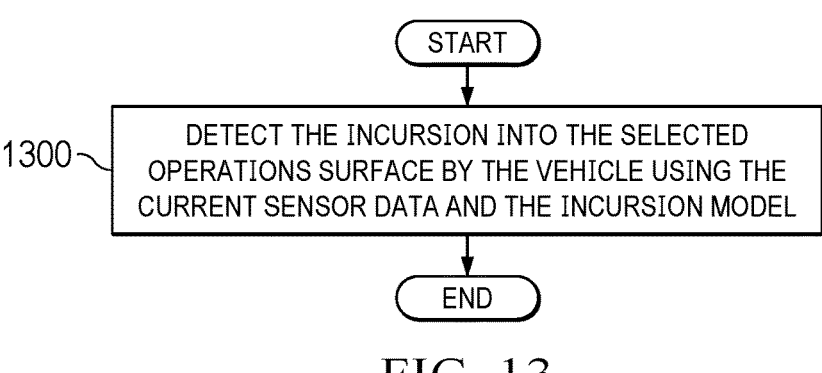

1300 — DETECT THE INCURSION INTO THE SELECTED OPERATIONS SURFACE BY THE VEHICLE USING THE CURRENT SENSOR DATA AND THE INCURSION MODEL

RUNWAY INCURSION DETECTION

BACKGROUND INFORMATION

1. Field

The present disclosure relates generally to aircraft and in particular, to detecting runway incursions.

2. Background

Runway incursions can occur when an object enters a runway without authorization. A runway incursion can be any occurrence at an airport involving the incorrect presence of an aircraft, vehicle or person on a protected area of a surface designated for the landing and take-off of aircraft. Runway incursions can result in confusion and delays airport operations.

An airport surface detection system can alert traffic controllers of potential runway conflicts by providing detailed coverage of movement on runways and taxiways. Data can be collected by different sensors. These sensors can include, for example, electro-optical sensor systems, infrared imaging systems, induction coils, microwave position sensor, a radar system, automatic dependent surveillance broadcast (ADS-B) and other types of sensors and systems that can be used to obtain location information for different objects. The location and movement of aircraft and vehicles can be displayed on a map of the airport. This display can provide situational awareness with respect to potential runway incursions.

A radar system provides a display of the layout with aircraft and vehicle movements on runways and taxiways. Electro-optical sensor systems can also be used to provide a video such that vehicles and other moving objects can be seen at the airport. These and other types of perception detection systems can inform pilots and other operators as to whether a runway is clear.

SUMMARY

An embodiment of the present disclosure provides an airport object location system comprising a number of vehicle location units, an electro-optical sensor system, and the model generator. The number of vehicle location units is connected to a number of vehicles. The number of vehicle location units generate vehicle location information for the number of vehicles in an area including an operations surface at an airport and vehicle timestamps for the vehicle location information. The electro-optical sensor system is connected to an aircraft. The electro-optical sensor system is configured to generate a video comprising frames of the area. The reference timestamps and reference location information are associated with the frames in the video. The model generator is configured to correlate the vehicle location information for the vehicles with the frames in the video using the vehicle timestamps, the reference location information, and the reference timestamps to form a dataset.

Another embodiment of the present disclosure provides an airport object location system comprising a number of vehicle location units, a sensor system, and a model generator. The number of vehicle location units is connected to a number of vehicles. The number of vehicle location units generate vehicle location information for the number of vehicles in an area including an operations surface at an airport and vehicle timestamps for the vehicle location information. The sensor system is connected to a reference vehicle. The sensor system is configured to generate sensor data for the area. The reference timestamps and reference location information are associated with the sensor data. The model generator is configured to correlate the vehicle location information for the vehicles with the sensor data using the vehicle timestamps, the reference location information, and the reference timestamps to form a dataset.

Yet another embodiment of the present disclosure provides a method for detecting objects at an airport. Vehicle location information is generated for the number of vehicles in an area including an operations surface at an airport and vehicle timestamps for the vehicle location information using a number of vehicle location units connected to the vehicles. Sensor data is generated for the area using a sensor system connected to a reference vehicle. Reference timestamps and reference location information are associated to the sensor data. The reference location information is for the reference vehicle. The vehicle location information for the vehicles is correlated with the sensor data using the vehicle timestamps, the reference location information, and the reference timestamps to form a dataset.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is an illustration of a flowchart of a process for training the machine learning model in accordance with an illustrative embodiment;

FIG. 12 is an illustration of a flowchart of a process for assessing and encouraging in accordance with an illustrative embodiment;

FIG. 13 is an illustration of a flowchart of a process for assessing an incursion in accordance with an illustrative embodiment;

DETAILED DESCRIPTION

Figure 1:
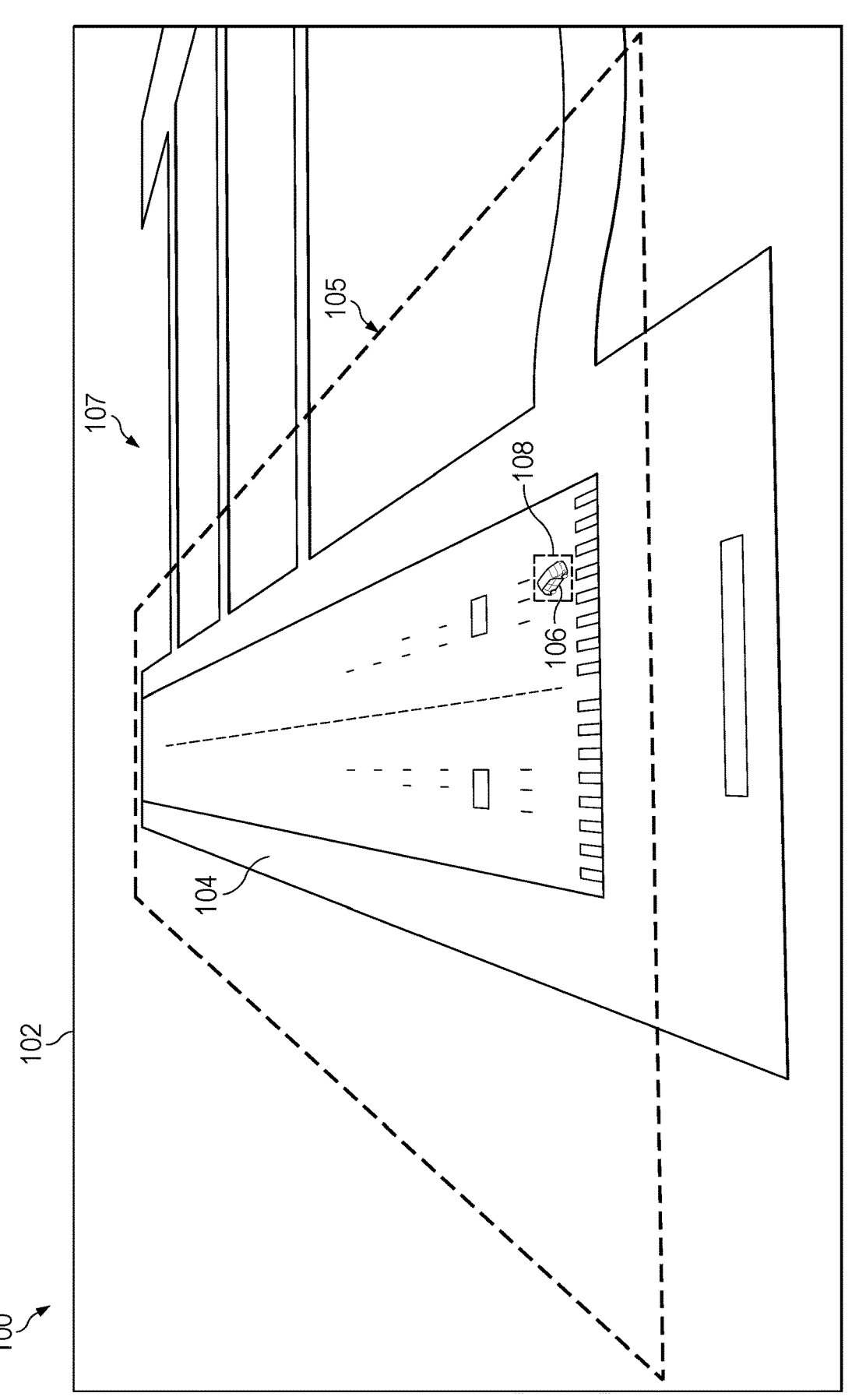
FIG. 1 is an illustration of incursion detection in accordance with an illustrative embodiment.

The illustrative embodiments recognize and take into account one or more different considerations. Many of the reception based detection systems employ cameras, lidar, and other sensors. The systems can use machine learning models to detect intrusion by vehicles as well as other aircraft.

Training a machine learning model to detect runway incursions can be challenging. For example, obtaining desired amounts of data to train machine learning model can be more difficult than desired to obtain a desired level accuracy needed to detect incursions onto a runway.

One or more illustrative embodiments can improve at least one of the amount and quality of the training data used to train machine learning models to detect incursions. For example, in developing training data, identifying the different vehicles that may be involved in a runway incursion event is important. An aircraft may be on approach when another vehicle such as aircraft or a ground vehicle on the runway. Training data can be obtained for the location of these and other vehicles or objects. This location information includes timestamps.

In obtaining the location information, a vehicle location unit can be connected to a vehicle for generating location information. These systems can be placed on vehicles near or on the runway. In the illustrative examples, the vehicle location unit is designed to work on any ground vehicle traveling in an airport environment. These vehicle location units provide accurate global positioning system (GPS) data. The global positioning system data can be collected in a manner that is accurate within one meter deviation. In these examples, this global positioning system data can be integrated with real-time kinematics (RTK) to increase the accuracy of the location information for the vehicles. With real-time kinematics, the accuracy can be increased to one centimeter.

In the illustrative examples, a location data collection system collects high-fidelity "truth" GPS and heading data from a vehicle location unit connected to the vehicle and synchronizes this information temporally with the vehicle's location in the sensor systems of an approaching aircraft. In other words, the location information can be synchronized or correlated with a video generated by an approaching aircraft.

Further, a video of the runway can be used as additional information for training data in addition to the location information obtained from vehicles. For example, aircraft on approach can generate a video comprising frames with location information for the aircraft and timestamps. This video can be correlated with the location of vehicles using the timestamps.

Thus, a video from an aircraft landing at an airport includes location information that can be correlated with location information for vehicles at the airport. The video and the location information can form a dataset used to train a machine learning model to detect incursions with greater accuracy as compared to current techniques.

In one illustrative example, an airport object location system comprises a number of vehicle location units connected to a number of vehicles. The number of location generation units generate vehicle location information for the number of vehicles in an area including an operations surface at an airport and vehicle timestamps for the vehicle location information. An electro-optical sensor system is connected to an aircraft. The electro-optical sensor system is configured to generate a video comprising frames of the area, wherein reference timestamps and reference location information are associated with the frames in the video. A model generator is configured to correlate the vehicle location information for the vehicles with the frames in the video using the vehicle timestamps, the reference location information, and the reference timestamps to form a dataset. This dataset can be used to train a machine learning model to detect incursions to an operations surface such as a runway or taxiways.

In this example, timestamps are used to identify where a vehicle is present in the video. As a result, this information can be used to identify useful parts of the video for use in creating the dataset. For example, the timestamps can be correlated with location information for vehicles that also have timestamps. These timestamps can be matched to identify the parts of the video that may be used for training data.

Further, with the use of a video, the profile or visibility of the location generation units connected to the vehicles can become an issue when using video in combination with location information to train the machine learning model. In obtaining the desired location accuracy, the antenna systems may have s profile or visibility such that the machine learning model begins to learn the presence of antennas rather than the vehicles. Thus, the localization generation unit can be designed to have a visibility in the video that avoids recognition of the location generation unit by an incursion model trained using the dataset.

With reference now to the figures and, in particular, with reference to FIG. 1, an illustration of incursion detection is depicted in accordance with an illustrative embodiment. As depicted, graphical user interface 100 is an interface in which frame 102 in a video is displayed. This video is generated by an electro-optical sensor system in an aircraft during landing. The aircraft can be selected from a group comprising a commercial airplane, a passenger airplane, a cargo airplane; a tilt-rotor aircraft, a tilt wing aircraft, a vertical takeoff and landing aircraft, an unmanned aerial vehicle, a drone, an electric vertical takeoff and landing vehicle, and a personal air vehicle.

As depicted, runway 104 within area 105 is seen in frame 102 of the video. In this example, vehicle 106 is present on runway 104. This area is an area within airport 107.

In this example, video has been analyzed by an incursion model, which has identified the presence of vehicle 106 on runway 104. This incursion model is a machine learning model that has been trained to detect the presence of vehicles in operation areas in an airport.

As depicted, a graphical indicator in the form of bounding box 108 has been associated with vehicle 106 to indicate incursion on runway 104 by vehicle 106. As a result, a number of different actions can be performed in response to the indication of this incursion in the video. For example, the pilot can abort the landing. The vehicle can be moved off the runway in time for landing the aircraft. In another example, a pilot can land the aircraft on a different runway. These and other actions can be performed in response to detecting incursion on runway 104.

As used herein, "a number of," when used with reference to items means one or more items. For example, "a number of different actions" can be one or more different actions.

The different illustrative examples can provide training data that improves the accuracy in at least one of detecting or predicting incursions into operation areas such as a runway. As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Figure 2:
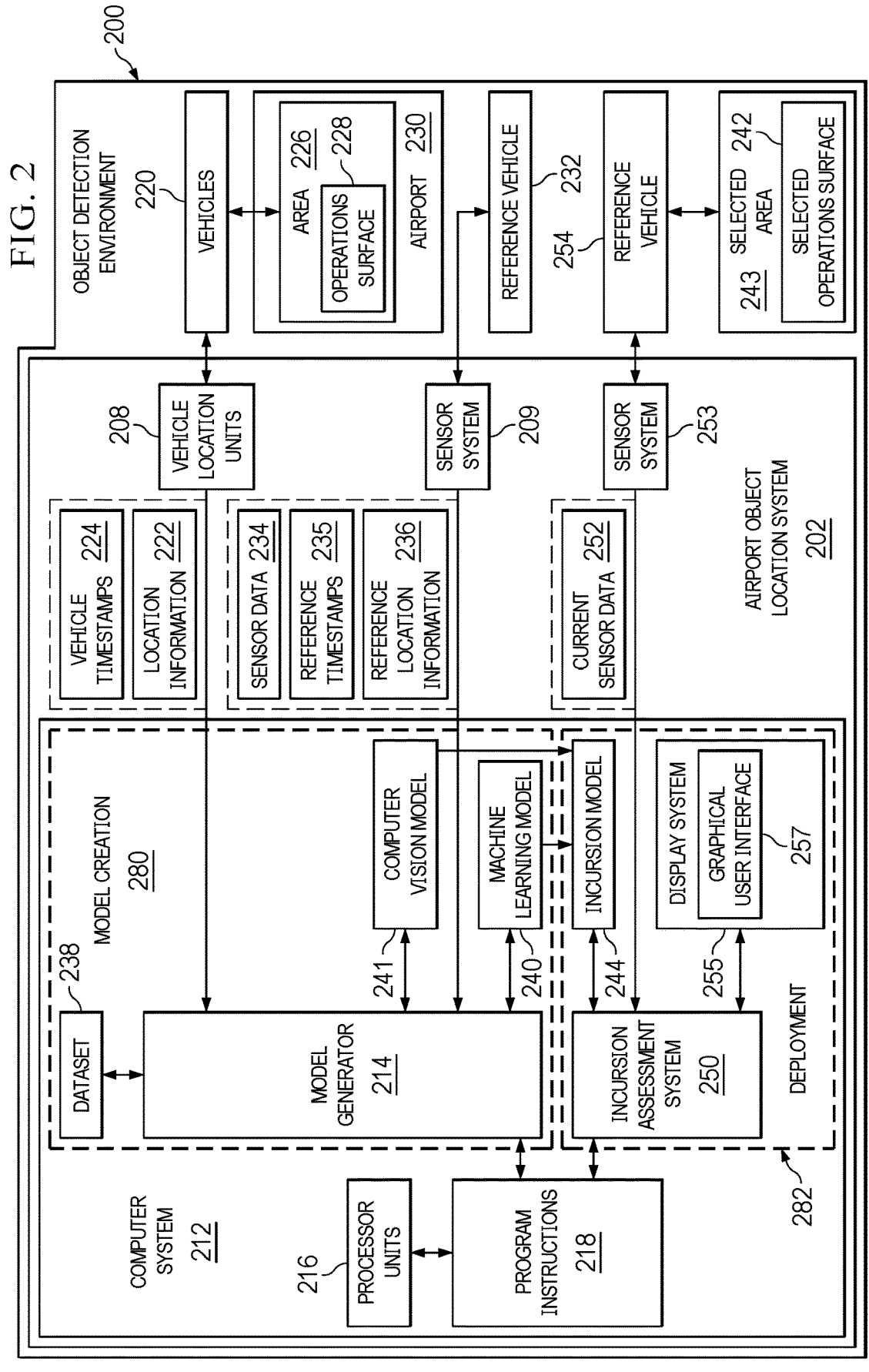
FIG. 2 is an illustration of a block diagram of an object detection environment in accordance with an illustrative embodiment.

With reference now to FIG. 2, an illustration of a block diagram of an object detection environment is depicted in accordance with an illustrative embodiment. In this illustrative example, airport object location system 202 can be used to assess incursions into operations surfaces at airports. In this illustrative example, the assessment of incursions can be performed using incursion model 244 created using dataset 238. The assessment can include at least one of detecting an incursion or predicting that an incursion will occur.

In this illustrative example, airport object location system 202 comprises a number of vehicle location units 208, a sensor system 209, and model generator 214.

In this illustrative example, the number of vehicle location units 208 are hardware systems that can also include software. The number of vehicle location units 208 is configured to be connected to number of vehicles 220.

When one component is "connected" to another component, the connection is a physical connection. For example, a first component, a vehicle location unit, can be considered to be physically connected to a second component, a vehicle, by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both. In some examples, the first component can be physically connected to the second component by being located within the second component.

In one illustrative example, the number of vehicle location units 208 is removably connected to the number of vehicles 220. In other words, the number of vehicle location units 208 can be temporarily connected to the number of vehicles 220.

When connected to the number of vehicles 220, the number of vehicle location units 208 generate vehicle location information 222 for the number of vehicles 220 and vehicle timestamps 224 for the vehicle location information 222 for area 226 including operations surface 228 at airport 230 when the number of vehicles 220 are in area 226. Operations surface 228 can take a number different forms. For example, operations surface 228 can be selected from a group comprising a runway, a taxiway, a ramp, a helipad, or other surface on which operations can be performed by different types of vehicles. In one example, operations surface 228 is a surface on which aircraft can operate. In other examples, operations surface 220 can be surfaces for other types of vehicles such as refueling vehicles, deicing vehicles, or other types of vehicles.

Sensor system 209 is a hardware system that can also include software. Sensor system 209 is configured to be connected to reference vehicle 232.

In this example, reference vehicle 232 can take a number of different forms. For example, reference vehicle 232 can be an aircraft, a ground vehicle, or some other suitable type of vehicle to which sensor system 209 can be connected.

When connected to reference vehicle 232, sensor system 209 generates sensor data 234 for area 226. In this example, reference timestamps 235 and reference location information 236 are associated with sensor data 234. In this example, sensor data 234 can include data about the number of vehicles 220 detected in area 226 by sensor system 209.

In this illustrative example, model generator 214 can be implemented in software, hardware, firmware or a combination thereof. When software is used, the operations performed by model generator 214 can be implemented in program instructions configured to run on hardware, such as a processor unit. When firmware is used, the operations performed by model generator 214 can be implemented in program instructions and data and stored in persistent memory to run on a processor unit. When hardware is employed, the hardware can include circuits that operate to perform the operations in model generator 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer-readable program instructions.

As used herein, a processor unit in the number of processor units 216 is a hardware device and is comprised of hardware circuits such as those on an integrated circuit that respond to and process instructions and program code that operate a computer.

When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different types of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, as part of model creation 280, model generator 214 receives vehicle timestamps 224 and vehicle location information 222 from the number of vehicle location units 208. Further, model generator 214 also receives sensor data 234, reference timestamps 235, in reference location information 236 from sensor system 209.

Model generator correlates vehicle location information 222 for vehicles 220 with sensor data 234 using vehicle timestamps 224, reference location information 236, and reference timestamps 235 to form dataset 238. In other words, vehicle location information 222 can be matched or associated with sensor data 234 using the timestamps.

The dataset comprises the sensor data 234, reference location information, and vehicle location information 222 and correlation to the reference location with sensor data 234. In these examples, this correlation of the location of vehicles 220 includes an identification of where vehicles 220 are located within the sensor data 234.

In some illustrative examples, one or more of vehicles 220 may be located outside of the field of view of the sensor system 209. However, the location of a vehicle outside of the field of view of sensor system 209 can still be included in dataset 238.

In this illustrative example, vehicle location information 222 for the number of vehicles 220 and reference location information 236 for reference vehicle 232 can be used to determine the location of the number of vehicles 220 in sensor data 234. The identification of the locations of vehicles 220 in sensor data 234 can be performed using this information with known techniques.

For example, a process such as geo-referencing or geo-tagging can be used. The spatial relationship between the location of sensor system 209 connected to a vehicle can be established using vehicle location information 222 for the vehicle and reference location information 236 for sensor system 209. The special relationship can include determining the relative position, orientation, and distance between the sensor system 209 and the vehicle at the time sensor data 234 was generated. This correlation can be made using vehicle timestamps 224 for the vehicle and reference timestamps 235 for sensor system 209.

Once this relationship is determined, the location of the vehicle can be located in sensor data 234. For example, sensor data 234 is a frame of data such as an image, a transformation matrix or algorithm that can be used to determine the location of the vehicle within sensor data 234 sensor system 209. As a result, more accurate identification and location of vehicles can be made with respect to the presence of those vehicles in sensor data 234 in a geospatial context as compared to current techniques.

Thus, the location of the number of vehicles 220 in sensor data 234 can be accurately correlated with the use of vehicle timestamps 224, vehicle location information 222, reference timestamps 235, and reference location information 236. This correlation using location information and timestamps generate increased accuracy in dataset 238 as compared to current techniques.

In this example, as part of model creation 280, model generator 214 operates to create incursion model 244. In one illustrative example, model generator 214 trains a machine learning model 240 using dataset 238. With this example, dataset 238 is a training dataset.

For example, model generator 214 trains a machine learning model 240 to detect incursions to selected operations surface 242 using dataset 238 to form incursion model 244. Incursion model 244 can detect incursions in selected area 243 including selected operations surface 242. In this depicted example, selected area 243 is one of area 226 at airport 230, a different area at airport 230, or another area at another airport. Dataset 238 can also be used to test and validate machine learning model 240.

In another illustrative example, model generator 214 can create computer vision model 241. Computer vision model 241 is a mathematical model that utilizes algorithms to analyze and interpret visual information in frames in videos. This interpretation includes identifying objects and patterns within the frames. This computer vision model can be tested and validated using dataset 238.

In another illustrative example, model generator 214 can combine machine learning model 240 and computer vision model 241. This combination of these two types of models form incursion model 244.

Thus, model generator 214 can create at least one of machine learning model 240 or computer vision model 241 in creating incursion model 244. In other words, model generator 214 can create incursion model 244 by at least one of training machine learning model 240, creating computer vision model 241, or a combination of these two types of models.

When computer vision model 241 and machine learning model 240 are combined to form incursion model 244, computer vision model 241 operates as a perceptual input layer that processes and extracts features from visual data such as frames. This extracted data can be input into machine learning model 240 for further analysis, pattern recognition, or decision-making.

In this example, incursion assessment system 250 can use incursion model 244 to assess incursions during deployment 282. Incursion assessment system 250 can be software, hardware, or software and hardware within computer system 212. In this example, incursion assessment system 250 can be implemented in program instructions 218 that can be executed by processor units 216.

As depicted, incursion assessment system 250 can receive current sensor data 252 from sensor system 253 connected to reference vehicle 254. Reference vehicle 254 can be an aircraft, a ground vehicle, or some other suitable type of vehicle. In this example, reference vehicle 254 is the same type of vehicle as reference vehicle 232 that generated sensor data to create dataset 238. For example, if reference vehicle 232 is a passenger aircraft, reference vehicle 254 is also a passenger aircraft of the same make and model. Further, in these examples, sensor system 253 is the same type of sensor system as sensor system 209. Additionally, in these examples, the location and orientation of sensor system 253 is the same as sensor system 209.

In this illustrative example, current sensor data 252 is for selected area 243. Current sensor data 252 is sensor data that is used to detect incursions rather than for use in training or creating models. Current sensor data 252 can be real-time sensor data. In these examples, real-time sensor data can be data that is generated as quickly as possible without intentional delays.

In this example, incursion assessment system 250 assesses an incursion into selected operations surface 242 by a vehicle using current sensor data 252 and incursion model 244. For example, incursion assessment system 250 can perform the assessment of an incursion by detecting the incursion into selected operations surface 242 by the vehicle using current sensor data 252 and incursion model 244. In another example, incursion assessment system 250 can perform the assessment by predicting that the incursion into the selected operations surface by the vehicle will occur using the current sensor data 252 and the incursion model 244.

Additionally, incursion assessment system 250 can display current sensor data 252 in graphical user interface 257 on display system 255. Display system 255 is a physical hardware system and includes one or more display devices on which graphical user interface 257 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

Incursion assessment system 250 can associate a graphical indicator with the vehicle in current sensor data 252 displayed on display system 255 in response to detecting the incursion. The indicator can take a number different forms. For example, the graphic indicator can be selected from at least one of a bounding box, an icon, a pictogram, an ideogram, a graphic, an image, text, animation, bolding, a color, a line, an arrow, or other suitable graphic. In other words, graphical indicator can be a single graphical element or a combination of graphical elements.

Figure 3:
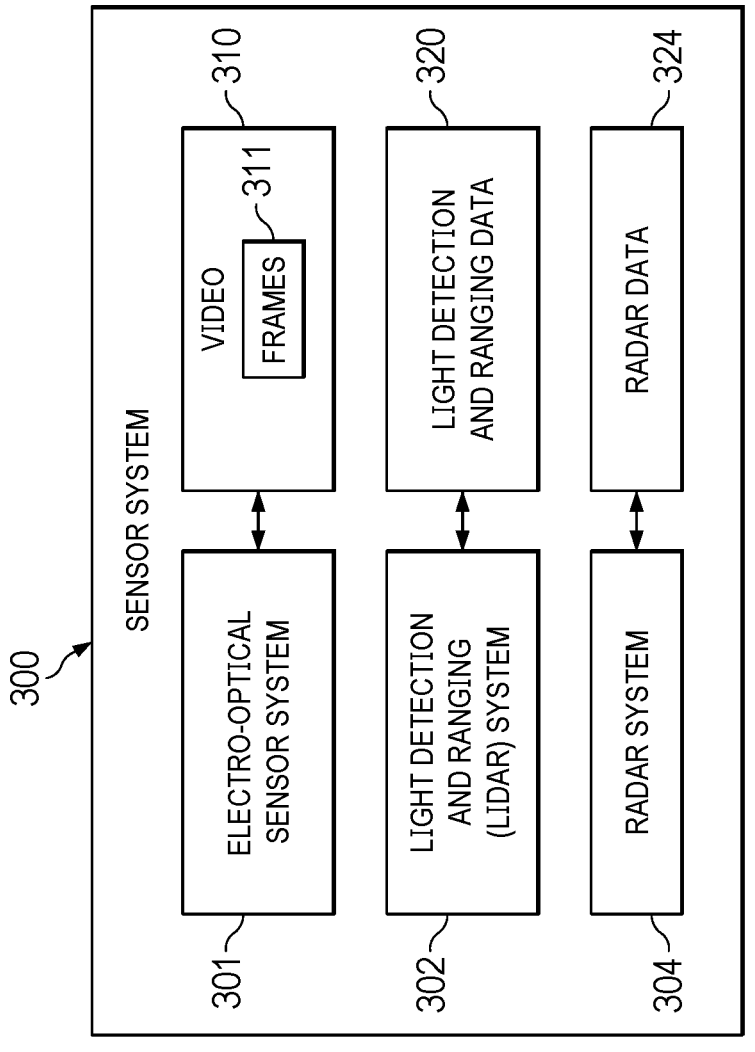
FIG. 3 is an illustration of sensor systems in sensor data in accordance with an illustrative embodiment.

With reference next to FIG. 3, an illustration of sensor systems in sensor data is depicted in accordance with an illustrative embodiment. In this illustrative example, example components that can be used to implement a sensor system is depicted in accordance with an illustrative embodiment. In this illustrative example, sensor system 300 is an example of an implementation for sensor system 209 and sensor system 253 in FIG. 2.

As depicted, sensor system 300 can include at least one of electro-optical sensor system 301, light detection and ranging (LIDAR) system 302, radar system 304, or some other type of sensor system that can detect the presence of a vehicle.

Electro-optical sensor system 301 is a hardware system that can include software. Electro-optical sensor system 301 can detect at least one of visible light, near infrared light, infrared radiation, ultraviolet light, or other types of radiation.

In this illustrative example, electro-optical sensor system 301 generates sensor data in the form of video 310, which is comprised of frames 311. In this example, frames 311 can also be referred to as images. In other words, a frame is a single image in a sequence of frames 311 that are images that form video 310.

Further, the sensor data generated by electro-optical sensor system 301 can include location information such as global positioning system (GPS) data for the location of electro-optical sensor system 301. The sensor data also includes timestamps in these illustrative examples.

As depicted, light detection and ranging system 302 is a hardware system that can include software and generates light detection and ranging data 320. This data can take a number different forms. For example, this data can be one of point cloud data, intensity data, or return information. In these examples, light detection and ranging data 320 also includes global positioning system data for the location of light detection and ranging system 302 and timestamps.

In this illustrative example, radar system 304 is a hardware system that can also include software. Radar system 304 generates radar data 324. In this example, radar data 324 can include different types of data such as distance data, velocity data, reflectivity data, and other types of data. In this example, radar system 304 also generates global positioning system data for the location of radar system 304 and timestamps.

In these illustrative examples, the different types of sensor data, video 310, light detection and ranging data 320, and radar data 324 are stored in a lossless format. The lossless format is used to increase the quality of the sensor data that is used for creating incursion models. In some illustrative examples, multiple types of sensors can be present that generate multiple types of sensor data for use in creating the dataset.

Figure 4:
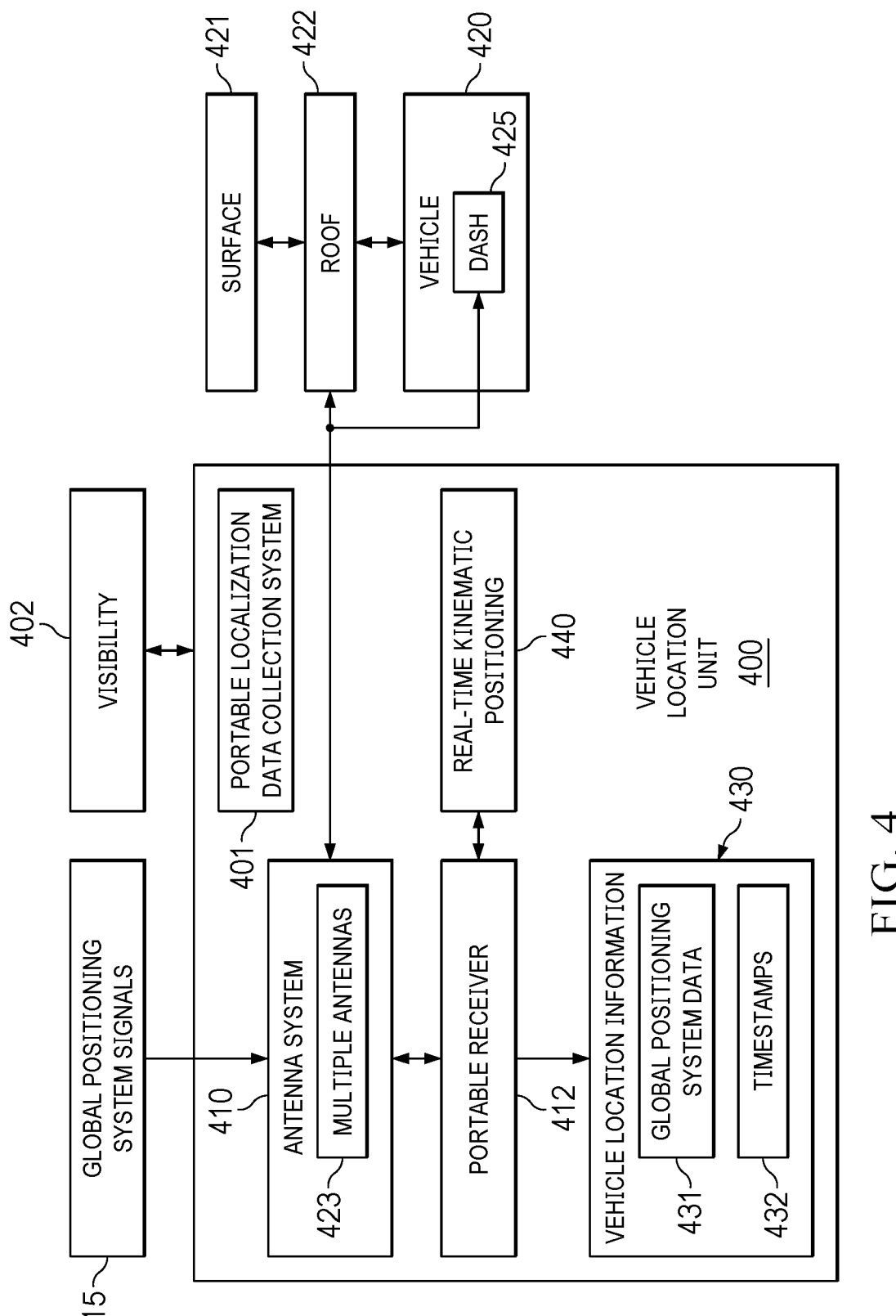
FIG. 4 is an illustration of a location generation unit in accordance with an illustrative embodiment.

Turning next to FIG. 4, an illustration of a location generation unit is depicted in accordance with an illustrative embodiment. In this example, vehicle location unit 400 is an example of an implementation for vehicle location units 208 in FIG. 2.

In this illustrative example, vehicle location unit 400 can be a portable localization data collection system 401. In other words, vehicle location unit 400 can be removable from one vehicle to another vehicle. In this example, vehicle location unit 400 has visibility 402 in the sensor data that avoids recognition of the vehicle location unit by an incursion model trained using the dataset.

In this illustrative example, vehicle location unit 400 comprises a number of different components. As depicted, vehicle location unit 400 includes antenna system 410 and portable receiver 412.

In this example, antenna system 410 receives global positioning system signals. Further, this antenna system is configured to be removably attached to vehicle 420. Further, in reducing visibility in a video, antenna system 410 when connected to roof 422 can have a height of 8 inches or less from surface 421 of roof 422 of vehicle 420. In another illustrative example, a height can be 6 inches or less from surface 421 of roof 422. In one illustrative example, antenna system 410 can be comprised of multiple antennas 423. These multiple antennas can be removably connected to roof 422. By increasing the number of antennas, increased accuracy can be obtained in generating vehicle location information 430.

In another illustrative example, visibility 402 can be reduced by connecting antenna system 410 to dash 425 of vehicle 420. In other words, antenna system 410 can be placed where visibility to satellites is present through the windshield in vehicle 420.

In this illustrative example, portable receiver 412 is connected to the antenna system 410. Portable receiver 412 processes global positioning system signals 415 received by the antenna system 410 to generate the vehicle location information 430 in a form of global positioning system data 431 and timestamps 432.

In another illustrative example, vehicle location unit 400 can also include real-time kinematic positioning 440. In this example, an additional antenna can be present in antenna system 410 that provides an internet connection to a reference station. The reference station also receives global positioning system signals and can provide real-time corrections.

Figure 5:
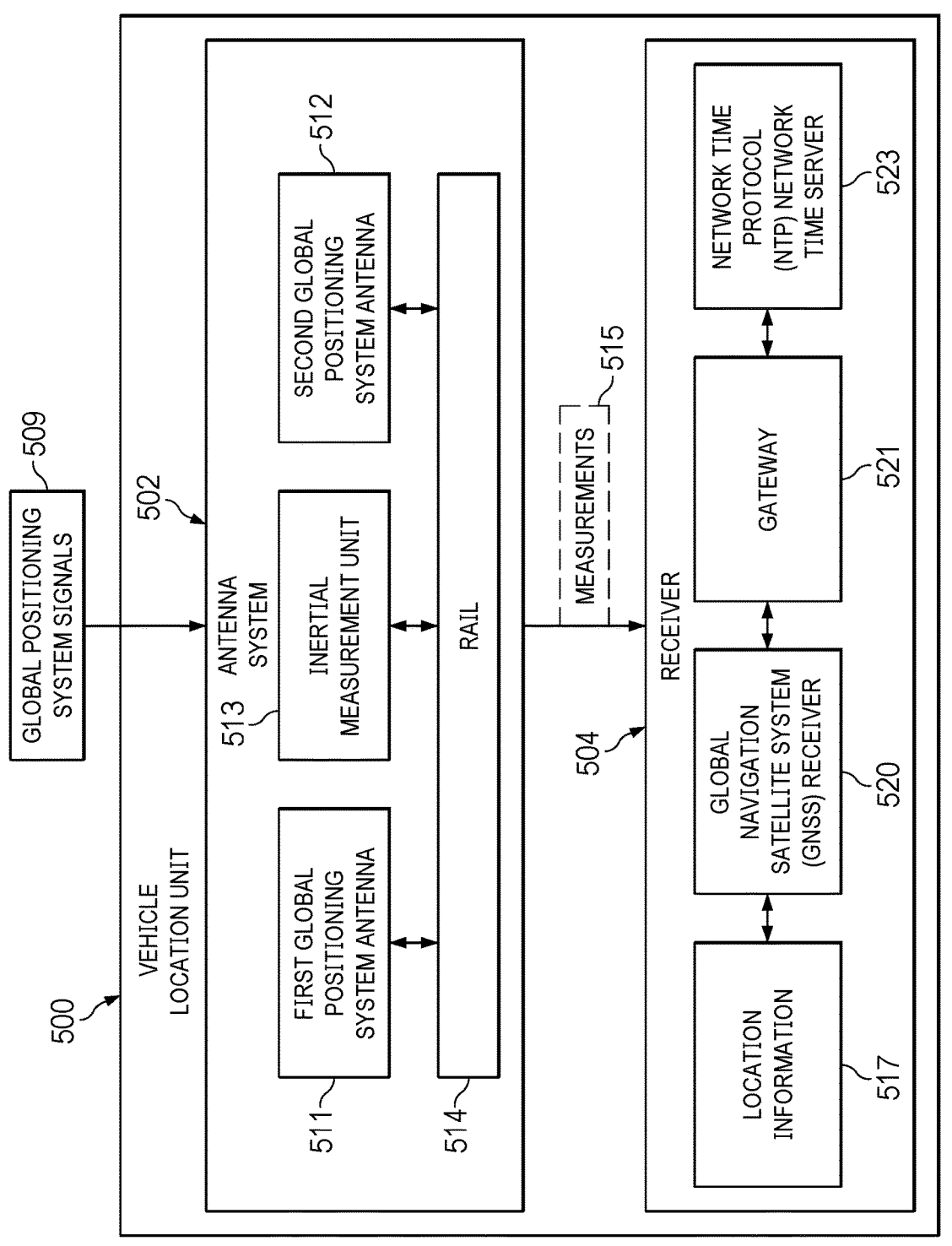
FIG. 5 is an illustration of a location generation unit in accordance with an illustrative embodiment.

With reference now to FIG. 5, another illustration of a location generation unit is depicted in accordance with an illustrative embodiment. In this example, vehicle location unit 500 is another illustrative example of an implementation for vehicle location units 208 in FIG. 2.

In this illustrative example, vehicle location unit 500 comprises antenna system 502 and receiver 504, which are examples of an implementation for antenna system 410 and portable receiver 412 in FIG. 4.

In this example, antenna system 502 comprises first global positioning system (GPS) antenna 511, second global positioning system (GPS) antenna 512, inertial measurement unit (IMU) 513, and rail 514.

In this example, rail 514 is a structural component. First global positioning system antenna 511, second global positioning system antenna 512, and inertial measurement unit 513 are connected to rail 514. Further, rail 514 is designed to be connected to the roof of the vehicle in this example. This connection can be made using various components such as suction cups, magnetic mounts, clamps, brackets, attachment farms, straps, and other suitable components.

First global positioning system antenna 511 and second global positioning system antenna 512 are hardware components that operate to receive global positioning system signals 509 from satellites. Inertial measurement unit 513 is a physical sensor device that can measure location information about an object to which this device is connected to. Inertial measurement unit 513 can include sensors such as accelerometers and gyroscopes. This type of sensor can measure acceleration, orientation, angular velocity, and other information. This information can be used to determine the location of an object in three-dimensional space.

In this illustrative example, measurements 515 made by first global positioning system antenna 511, second global positioning system antenna 512, and inertial measurement unit 513 are sent to receiver 504 and are processed to generate location information 517. This location information generated by receiver 504 includes location and timestamps. The location can be in three-dimensional coordinates and can include orientation. In some examples, a speed or velocity can also be included in the location information.

In this illustrative example, receiver 504 comprises a number of different hardware components. As depicted, receiver 504 includes global navigation satellite system (GNSS) receiver 520, gateway 521, and network protocol (NTP) network time server 523.

In this example, global navigation satellite system (GNSS) receiver 520 uses signals in measurements 515 for multiple satellites to determine a three-dimensional position. Additionally, this component can also determine velocity and timing information.

Further, in one illustrative example, this receiver can also implement real-time kinematics (RTK). This feature is used by global navigation satellite system (GNSS) receiver 520 to increase the accuracy in determining the location of the vehicle to which vehicle location unit 500 is connected.

Gateway 521 is a hardware device that provides a connection to other networks or devices. This connection can be used to transmit information such as location information 517.

In this example, network time protocol (NTP) network time server 523 is a hardware device that operates as a time server. This component provides adequate time information to other devices within receiver 504 such as global navigation satellite system (GNSS) receiver 520.

Thus, one or more technical solutions are present in one or more illustrative examples that overcome a technical problem with generating training data to train machine learning models to assess incursions. This assessment can include at least one of detecting an incursion or predicting that an incursion will occur into an operations surface at an airport. In the illustrative examples, location information is collected from vehicles in an area that includes the operation surface. Timestamps can be associated with the location information.

Further, sensor data such as a video can be generated by reference vehicle. This reference vehicle can be an aircraft in flight, an aircraft on the ground, a ground vehicle, or other suitable vehicle. The video includes location information for the reference vehicle and timestamps.

The location information with the timestamps from the vehicles can be correlated to the video using the location information and the timestamps for the video. This correlated information can be used as training data for machine learning model to generate an incursion model processing incursions. The correlated information can also be used to test and validate computer vision models.

Further, the illustrative examples use vehicle location units that have a visibility that avoids the machine learning model learning the presence of the antenna system instead of the vehicle. Further, this visibility also includes avoiding the machine learning model learning that the vehicle must include the presence of the antenna system. In other words, visibility of the vehicle location units is such that the machine learning model recognizes the presence of vehicles even without antenna systems. This visibility can be such that computer vision models also do not detect the antenna system instead of the vehicle or require the presence of the antenna system to detect vehicle.

This incursion model can then be used by an incursion assessment system to assess an incursion. At least one of predicting or detecting an incursion and an operation area can be used to perform a number of actions. For example, the vehicle generating the video can move to avoid any vehicles detected or predicted to enter an operations surface. In another illustrative example, vehicles in or predicted to enter an operations surface can be moved to leave the operations surface or avoid the operations surface.

Computer system 212 can be configured to perform at least one of the steps, operations, or actions described in the different illustrative examples using software, hardware, firmware or a combination thereof. As a result, computer system 212 operates as a special purpose computer system in which model generator 214 in computer system 212 enables detecting objects at an airport. In particular, at least one of model generator 214 or incursion assessment system 250 transforms computer system 212 into a special purpose computer system as compared to currently available general computer systems that do not have model generator 214.

In the illustrative example, the use of model generator 214 in computer system 212 integrates processes into a practical application for detecting objects such as vehicles that may be located or predicted to enter an operation area.

The illustration of object detection environment 200 in FIGS. 2-5 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, reference location units can be connected to other objects to generate dataset 238. For example, reference location units can be carried by people, carts, or other objects that move or can be moved.

Figure 6:
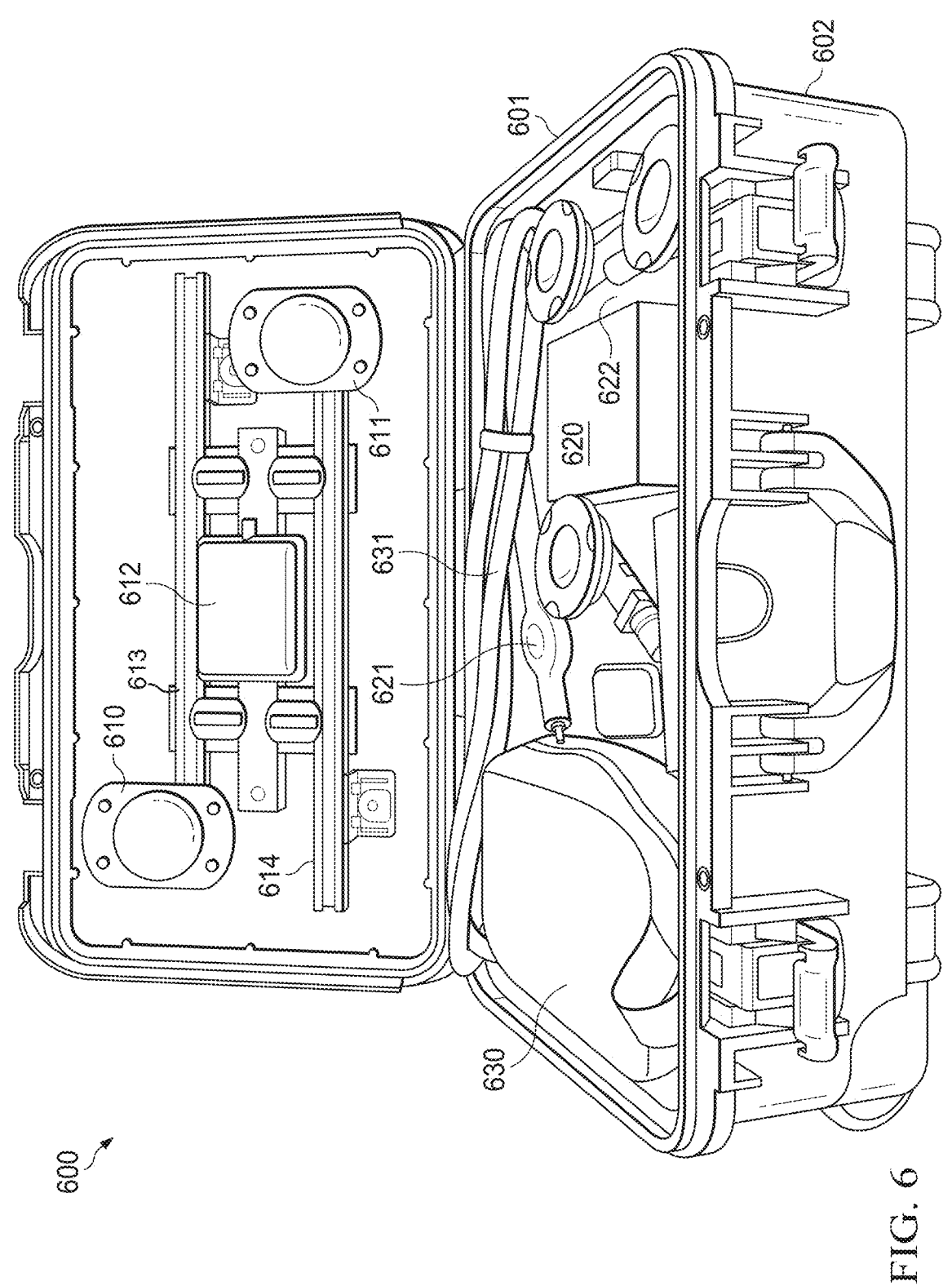
FIG. 6 is an illustration of a reference location unit in accordance with an illustrative embodiment.

Turning now to FIG. 6, an illustration of a reference location unit is depicted in accordance with an illustrative embodiment. In this illustrative example, reference location unit 600 is an example implementation of vehicle location unit 400 in FIG. 4 and vehicle location unit 500 in FIG. 5.

In this example, case 601 is a plastic case that houses components for reference location unit 600. Case 601 provides portability and transporting reference location unit 600. In other example, case 601 can be comprised of other materials such as a metal, aluminum, a composite, or other suitable material.

In this example, GPS antenna 610 connected to rail 613, GPS antenna 611 connected to rail 614, and IMU 612 configured to connect to rail 614 and rail 613, all store within case 601. Additionally, NTP network time server 620, GNSS receiver 621, and gateway 622 are also located within case 601.

Other components can also be present in case 601. For example, case 601 in this also includes toolkit 630 and cable 631 configured to connect to GPS antenna 610, GPS antenna 611, and IMU 612. In this example, connectors are present on a panel (not shown) on side 602 of case 601. A fan is an example of another component that can be included in case 601. The fan can provide cooling for other components within case 601. Further, in these illustrative examples, case 601 is a waterproof or water resistant case.

Figure 7:
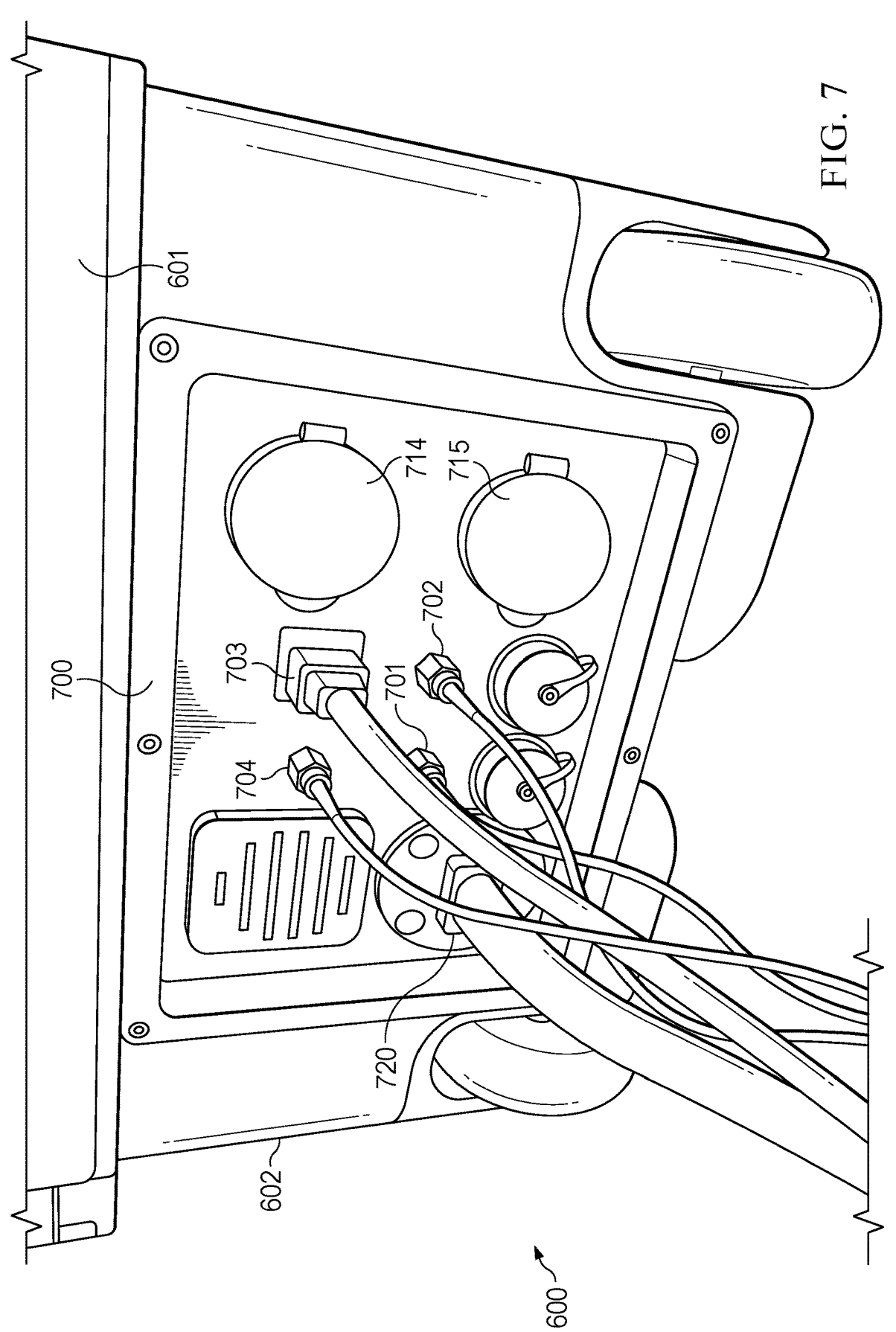
FIG. 7 is another illustration of a reference location unit in accordance with an illustrative embodiment.

Turning next to FIG. 7, another illustration of a reference location unit is depicted in accordance with an illustrative embodiment. In the illustrative examples, the same reference numeral may be used in more than one figure. This reuse of a reference numeral in different figures represents the same element in the different figures.

In this example, in view of side 602 in case 601 is shown for reference location unit 600. In this view, panel 700 on side 602 provides connections or components such as GPS antenna 610, GPS antenna 611, and IMU 612 in FIG. 6 when those components are deployed and connected to the roof of the vehicle.

As depicted, panel 700 includes ANT1 701 which is connected to GPS antenna 610, ANT 702 which is connected to GPS antenna 611, and IMU 703 which is connected to IMU 612. Further, panel 700 also includes NTP ANT 704 which provides antenna connection for NTP network time server 620.

Further, power connector 720 provides a connection to a power source. The power source can be a battery, a generator, power inverter in the vehicle, or other power source.

Panel 700 also includes other connections such as universal serial bus (USB) ports 714 and display port 715.

Figure 8:
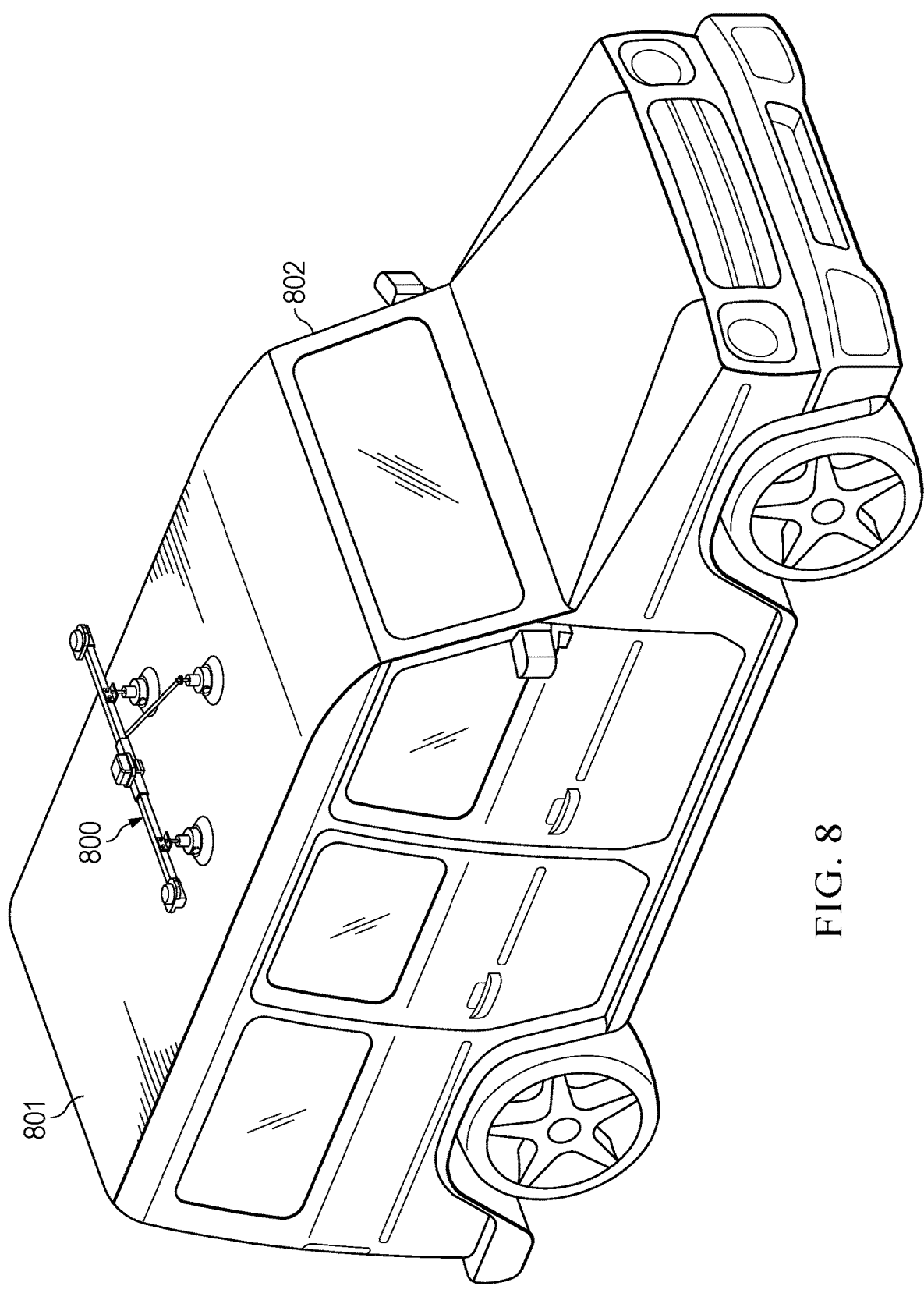
FIG. 8 is an illustration of an antenna system connected to a vehicle in accordance with an illustrative embodiment.

With reference now to FIG. 8, an illustration of an antenna system connected to a vehicle is depicted in accordance with an illustrative embodiment. In this illustrative example, antenna system 800 is connected to roof 801 of vehicle 802.

As depicted in this example, antenna system 800 has dimensions that reduce visibility of antenna system 800 in images generated of vehicle 802 for a dataset. This visibility of antenna system 800 is such that the machine learning model does not learn to recognize antenna system 800 instead of vehicle 802 or learn to recognize that vehicle 802 only when antenna system 800 is present.

Figure 9:
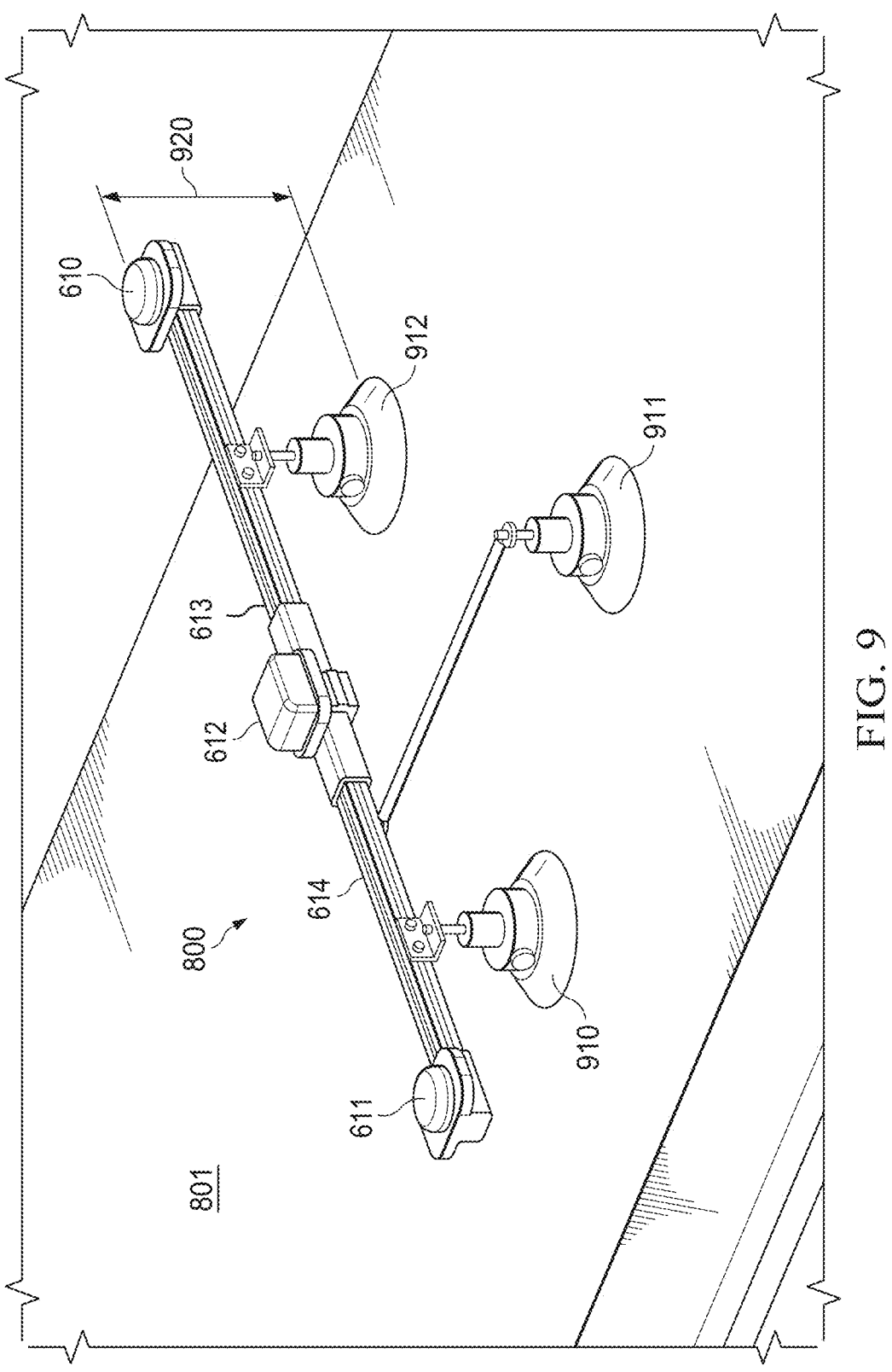
FIG. 9 is an illustration of an antenna system in accordance with an illustrative embodiment.

Turning now to FIG. 9, an illustration antenna system is depicted in accordance with an illustrative embodiment. A more detailed view of antenna system 800 is depicted. In this example, antenna system 800 comprises IMU 612 connected to rail 614 connected to GPS antenna 611 and to rail 613 connected to GPS antenna 610.

In this example, rail 614, rail 613, and IMU 612 are connected to roof 801 in FIG. 8 using magnetic mount 910, magnetic mount 911, and magnetic mount 912. Other types of connectors can be used in other examples. For example, suction cups can be used in place of the magnetic mount depicted in this figure.

The illustration of antenna system 800 is an example of one antenna system used in vehicle location units and is not intended to limit the manner in which other antenna systems can be implemented. For example, other antenna systems can have other numbers of GPS antennas greater than two. For example, one or three GPS antennas can be used in place of the two GPS antennas depicted in this figure. Further, other components are present but not shown in this example. For example, cable 631 connecting GPS antenna 610, GPS antenna 611, and IMU 612 to a receiver through panel 700 are not shown in this example.

In this illustrative example, antenna system 800 has height 920 that is 6 inches or less. In another illustrative example, height 920 can be 8 inches or less. A higher height can be used when other components are located on roof 801 such as a roof rack or rails.

In the different illustrative examples, height 920 is selected such that visibility of antenna system 800 results in in machine learning model recognizes vehicle and not the antennas in the antenna systems. In these examples, the height is selected such that the visibility does not result in the machine learning model recognizing antenna system 800 or only recognizing vehicle 802 when antenna system 800 is present.

Further, other design changes can be made to antenna system 800 to reduce visibility within a video generated for the dataset. For example, the color of antenna system 800 can be selected to be similar to the color of vehicle 802. In another example, antenna system 800 can be installed in the dash of vehicle 802 such that visibility to a sky view is present for the GPS antennas. In yet another example, antenna system 800 can be attached to a side of vehicle 802 where a sky view is still present.

Figure 10:
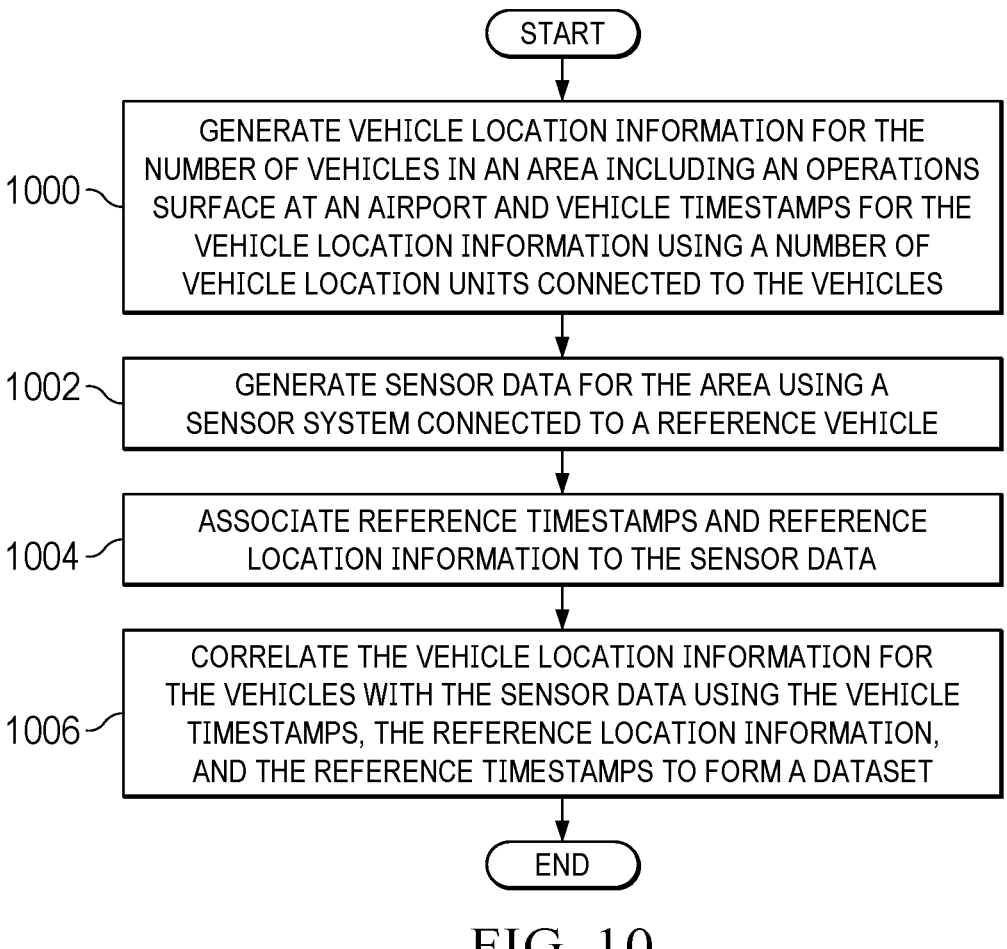
FIG. 10 is an illustration of a flowchart of a process for detecting objects in accordance with an illustrative embodiment.

Turning next to FIG. 10, an illustration of a flowchart of a process for detecting objects is depicted in accordance with an illustrative embodiment. The process in FIG. 10 can be implemented in hardware, software, or both. When implemented in software, the process can take the form of program instructions that are run by one of more processor units located in one or more hardware devices in one or more computer systems. For example, the process can be implemented in model generator 214 in computer system 212 in FIG. 2.

The process generates vehicle location information for the number of vehicles in an area including an operations surface at an airport and vehicle timestamps for the vehicle location information using a number of vehicle location units connected to the vehicles (operation 1000). The process generates sensor data for the area using a sensor system connected to a reference vehicle (operation 1002).

The process associates reference timestamps and reference location information to the sensor data (operation 1004). In operation 1004, the reference location information is for location of the reference vehicle and in particular the reference location information is for the sensor system connected to the reference vehicle.

The process correlates the vehicle location information for the vehicles with the sensor data using the vehicle timestamps, the reference location information, and the reference timestamps to form a dataset (operation 1006). The process terminates thereafter.

Turning next to FIG. 11, an illustration of a flowchart of a process for training the machine learning model is depicted in accordance with an illustrative embodiment. The process in this figure is an example of an additional operation that can form with the operations in FIG. 10.

The process trains a machine learning model to assess incursions to a selected operations surface using the dataset to form an incursion model (operation 1100). The process terminates thereafter. In operation 1100, incursion model assesses incursions by vehicles in a selected area including the selected operations surface.

Next in FIG. 12, an illustration of a flowchart of a process for assessing and encouraging is depicted in accordance with an illustrative embodiment. The process in FIG. 12 can be implemented in hardware, software, or both. When implemented in software, the process can take the form of program instructions that are run by one of more processor units located in one or more hardware devices in one or more computer systems. For example, the process can be implemented in incursion assessment system 250 in computer system 212 in FIG. 2.

The process receives current sensor data for the selected area from a new sensor system (operation 1200). The process assesses an incursion into the selected operations surface by a vehicle using the current sensor data and the incursion model (operation 1202). The process terminates thereafter.

With reference now to FIG. 13, an illustration of a flowchart of a process for assessing an incursion is depicted in accordance with an illustrative embodiment. The process in this figure is an example of an implementation for operation 1202 in FIG. 12.

The process detects the incursion into the selected operations surface by the vehicle using the current sensor data and the incursion model (operation 1300). The process terminates thereafter.

Figure 14:
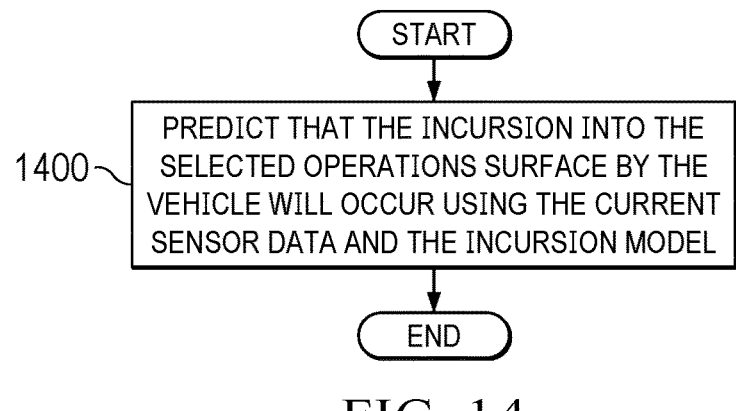
FIG. 14 is an illustration of a flowchart of a process for assessing an incursion in accordance with an illustrative embodiment.

Turning to FIG. 14, an illustration of a flowchart of a process for assessing an incursion is depicted in accordance with an illustrative embodiment. The process in this figure is an example of an implementation for operation 1202 in FIG. 12.

The process predicts that the incursion into the selected operations surface by the vehicle will occur using the current sensor data and the incursion model (operation 1400). The process terminates thereafter.

Figure 15:
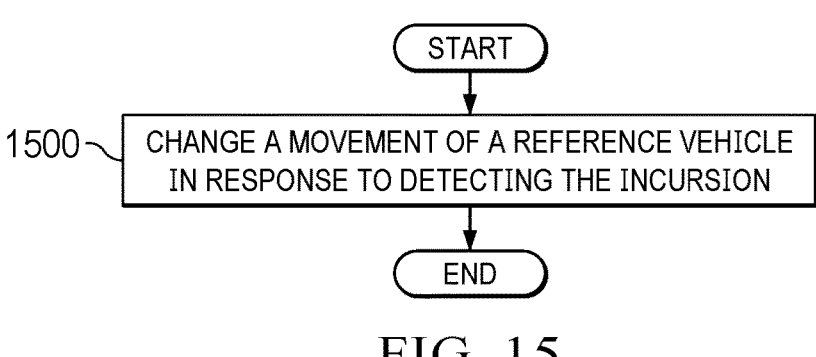
FIG. 15 is an illustration of a flowchart of a process for performing an action to an incursion in accordance with an illustrative embodiment.

With reference to FIG. 15, an illustration of a flowchart of a process for performing an action in response to an incursion is depicted in accordance with an illustrative embodiment. This process can be implemented by a vehicle involved in the incursion. This vehicle can be a reference vehicle that generates the sensor data or video. For example, the process can be implemented in an aircraft that is landing.

The process changes a movement of a reference vehicle in response to detecting the incursion (operation 1500).

Figure 16:
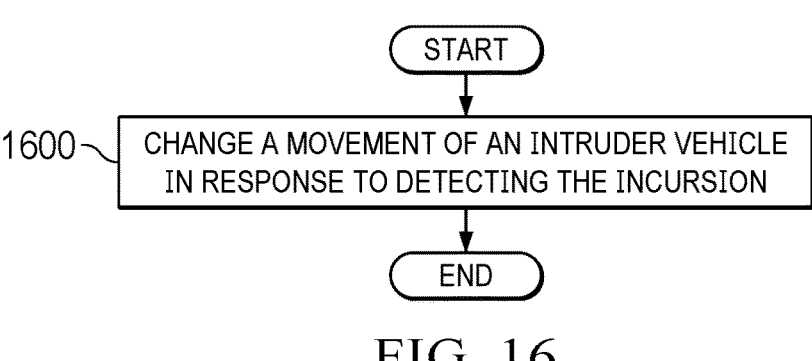
FIG. 16 is an illustration of a flowchart of a process for performing an action in response to an incursion in accordance with an illustrative embodiment.

In FIG. 16, an illustration of a flowchart of a process for performing an action in response to an incursion is depicted in accordance with an illustrative embodiment. This process can be implemented by a vehicle involved in the incursion. This vehicle can be an intruder vehicle that has caused or is predicted to cause an incursion.

The process changes a movement of an intruder vehicle in response to detecting the incursion (operation 1600). The process terminates thereafter. This movement can be to move the vehicle off of the operations surface or move to avoid entering the operations surface.

When changing a movement of a vehicle in operation 1500 in FIG. 15 and in operation 1600 in FIG. 16, the change can be a preprogrammed behavior when the vehicle is for an unpiloted vehicle.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 17:
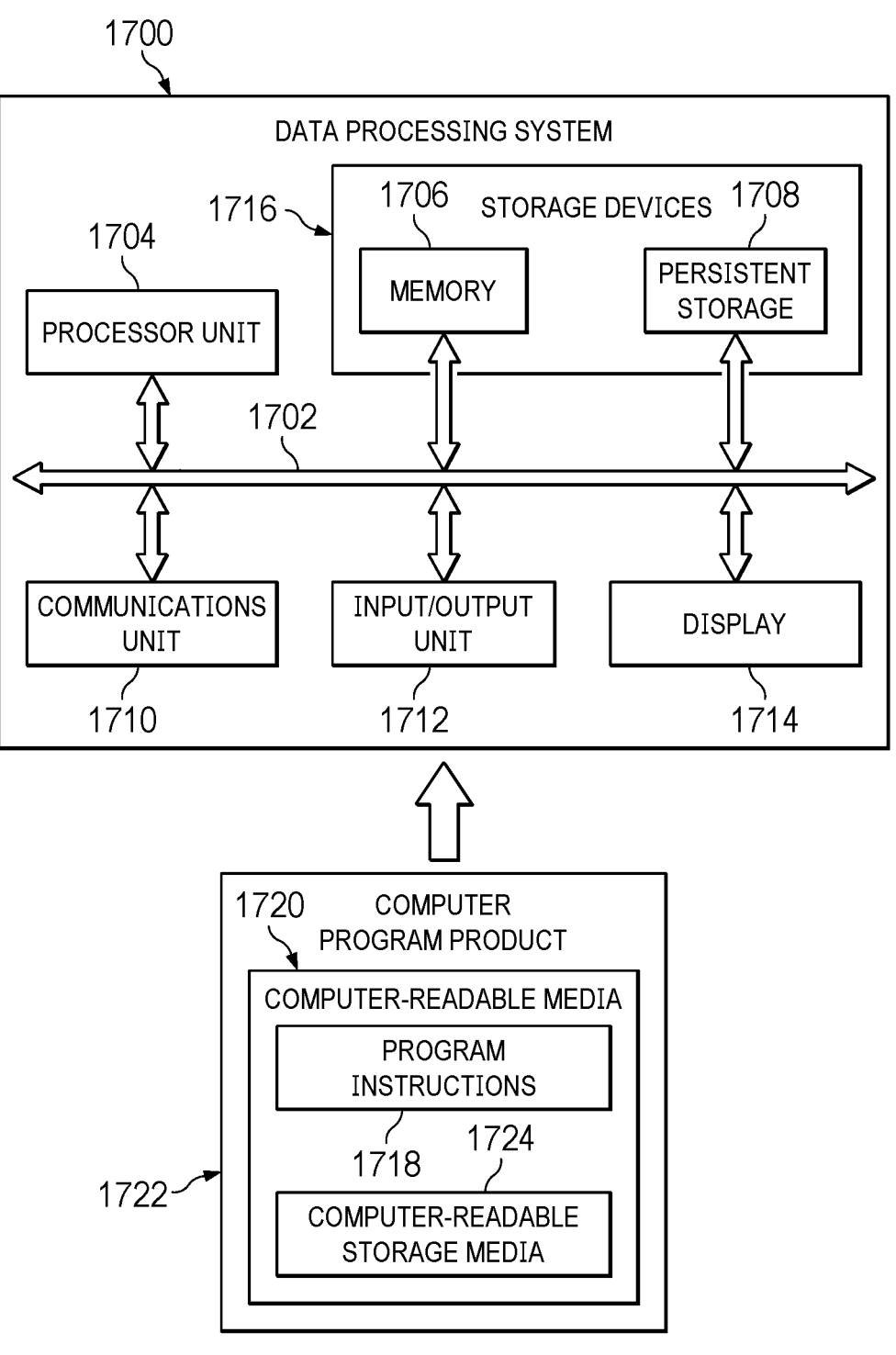
FIG. 17 is an illustration of a block diagram of a data processing system in accordance with an illustrative embodiment.

Turning now to FIG. 17, an illustration of a block diagram of a data processing system is depicted in accordance with an illustrative embodiment. Data processing system 1700 can be used to implement computer system 212 in FIG. 2. In this illustrative example, data processing system 1700 includes communications framework 1702, which provides communications between processor unit 1704, memory 1706, persistent storage 1708, communications unit 1710, input/output (I/O) unit 1712, and display 1714. In this example, communications framework 1702 takes the form of a bus system.

Processor unit 1704 serves to execute instructions for software that can be loaded into memory 1706. Processor unit 1704 includes one or more processors. For example, processor unit 1704 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1704 can be implemented using one or more heterogeneous processor systems in which a main processor is present with secondary processors on a single chip. As another illustrative example, processor unit 1704 can be a symmetric multi-processor system containing multiple processors of the same type on a single chip.

Memory 1706 and persistent storage 1708 are examples of storage devices 1716. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1716 may also be referred to as computer readable storage devices in these illustrative examples. Memory 1706, in these examples, can be, for example, a random-access memory or any other suitable volatile or non-volatile storage device. Persistent storage 1708 may take various forms, depending on the particular implementation.

For example, persistent storage 1708 may contain one or more components or devices. For example, persistent storage 1708 can be a hard drive, a solid-state drive (SSD), a flash memory, a rewritable optical disk, a rewritable magnetic tape, or some combination of the above. The media used by persistent storage 1708 also can be removable. For example, a removable hard drive can be used for persistent storage 1708.

Communications unit 1710, in these illustrative examples, provides for communications with other data processing systems or devices. In these illustrative examples, communications unit 1710 is a network interface card.

Input/output unit 1712 allows for input and output of data with other devices that can be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs can be located in storage devices 1716, which are in communication with processor unit 1704 through communications framework 1702. The processes of the different embodiments can be performed by processor unit 1704 using computer-implemented instructions, which may be located in a memory, such as memory 1706.

These instructions are referred to as program instructions, computer usable program instructions, or computer readable program instructions that can be read and executed by a processor in processor unit 1704. The program instructions in the different embodiments can be embodied on different physical or computer readable storage media, such as memory 1706 or persistent storage 1708.

Program instructions 1718 are located in a functional form on computer readable media 1720 that is selectively removable and can be loaded onto or transferred to data processing system 1700 for execution by processor unit 1704. Program instructions 1718 and computer readable media 1720 form computer program product 1722 in these illustrative examples. In the illustrative example, computer readable media 1720 is computer readable storage media 1724.

Computer readable storage media 1724 is a physical or tangible storage device used to store program instructions 1718 rather than a medium that propagates or transmits program instructions 1718. Computer readable storage media 1724 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAN), a read-only memory (ROM), an erasable programmable read-only memory (EPROM or Flash memory), a static random access memory (SPA), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer readable storage media 1724, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 1718 can be transferred to data processing system 1700 using a computer readable signal media. The computer readable signal media are signals and can be, for example, a propagated data signal containing program instructions 1718. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1720" can be singular or plural. For example, program instructions 1718 can be located in computer readable media 1720 in the form of a single storage device or system. In another example, program instructions 1718 can be located in computer readable media 1720 that is distributed in multiple data processing systems. In other words, some instructions in program instructions 1718 can be located in one data processing system while other instructions in program instructions 1718 can be located in one data processing system. For example, a portion of program instructions 1718 can be located in computer readable media 1720 in a server computer while another portion of program instructions 1718 can be located in computer readable media 1720 located in a set of client computers.

The different components illustrated for data processing system 1700 are not meant to provide architectural limitations to the manner in which different embodiments can be implemented. In some illustrative examples, one or more of the components may be incorporated in or otherwise form a portion of, another component. For example, memory 1706, or portions thereof, may be incorporated in processor unit 1704 in some illustrative examples. The different illustrative embodiments can be implemented in a data processing system including components in addition to or in place of those illustrated for data processing system 1700. Other components shown in FIG. 17 can be varied from the illustrative examples shown. The different embodiments can be implemented using any hardware device or system capable of running program instructions 1718.

In these examples, program instructions 1718 can be program instructions for at least one of model generator 214 or incursion assessment system 250. These program instructions can be run on a computer system to perform one or more of different operations described in the illustrative examples. As program instructions located on computer readable storage media 1724 in computer program product 1720 can be loaded onto one or more processor units in a computer system to perform one or more of the operations described for the different illustrative examples.

Thus, illustrative examples provide a method, apparatus, system, and computer program product for object identification. The subject identification performed budget incursions into an operations surface at an airport. In one illustrative example, an airport object location system comprises a number of vehicle location units, a sensor system, and a model generator. The number of vehicle location units is connected to a number of vehicles. The number of vehicle location units generate vehicle location information for the number of vehicles in an area including an operations surface at an airport and vehicle timestamps for the vehicle location information. The sensor system is connected to a reference vehicle. The sensor system is configured to generate sensor data for the area, wherein reference timestamps and reference location information are associated with the sensor data. The model generator is configured to correlate the vehicle location information for the vehicles with the sensor data using the vehicle timestamps, the reference location information, and the reference timestamps to form a dataset.

The different illustrative examples provide an ability to increase the amount of training data for use in training a machine learning model to form an incursion model that can detect or predict incursions into an operations surface at an airport. This operations surface can be a runway, a taxiway, or other area in an airport where aircraft may move. Further, the illustrative examples enable increasing the amount of data used to test and validate a computer vision model created to form an incursion model as compared to current techniques of collecting data.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An airport object location system that comprises a vehicle location unit configured to connect to vehicles, wherein each of the vehicles is configured to perform a different operation from a remainder of the vehicles and the vehicle location unit is configured to generate:
   vehicle location information accurate to within one meter for each of the vehicles in a format for integration with real-time kinematics; and
   vehicle timestamps for the vehicle location information, wherein the vehicle location unit comprises:
      an antenna system that comprises:
         a first global positioning satellite antenna affixed at a first end of a first rail;
         a second global positioning satellite antenna affixed at a first end of a second rail; and
         an inertial measurement unit configured to receive and retain a second end of the first rail and to receive and retain a second end of the second rail;
      mounts configured to temporarily suctorially or magnetically connect the first rail and the second rail to a vehicle and to be removed for reuse on other of the vehicles, wherein the antenna system and the mounts when connected together and mounted on a surface of any of the vehicles extend 8 inches or less from the surface of any of the vehicles;
      a receiver that comprises:
         a network time protocol network time server;
         a global navigation satellite system;
         a gateway configured to transmit location information; and
      a case that is manually portable, configured to retain all components of the vehicle location unit, and comprises an electrical panel that faces an outside of the case on a side of the case and is configured to connect electrically to:
         the first global positioning satellite antenna;
         the second global positioning satellite antenna;
         the inertial measurement unit;
         an antenna of the network time protocol network time server;
         a battery;
         a universal serial bus port; and
         a display unit port.

2. The airport object location system of claim 1, further comprising:
   an electro-optical sensor system connected to reference vehicle, wherein the electro-optical sensor system is configured to generate a video comprising frames of an area, wherein reference timestamps and reference location information are associated with the frames in the video; and
   a model generator configured to correlate the vehicle location information for the vehicles with the frames in the video using the vehicle timestamps, the reference location information, and the reference timestamps to form a dataset, wherein the model generator is configured to train a machine learning model to detect incursions to a selected operations surface based upon the dataset to form an incursion model, wherein the incursion model is configured to detect incursions in a selected area.

3. The airport object location system of claim 2, wherein:
the model generator is configured to:
    create a computer vision model to detect incursions to
        a selected operations surface; and
    test and validate the computer vision model using the
        dataset; and
the vehicle location unit further comprises a size and
    visual profile that when assembled and mounted on a
    vehicle cannot be recognized, by the machine learning
    model as distinct from a vehicle it is mounted on.

4. The airport object location system of claim 2, further
comprising an incursion assessment system configured to:
    receive a current video for the selected area; and
    detect an incursion into the selected operations surface by
        a vehicle using the current video and the incursion
        model.

5. The airport object location system of claim 4, wherein
the incursion assessment system is configured to:
    display the current video on a display system; and
    associate a graphical indicator with the vehicle in the
        current video displayed on the display system in
        response to detecting the incursion.

6. The airport object location system of claim 2, wherein:
wherein the vehicles comprise at least one of: an aircraft,
    a cart, a refueling vehicle, or a deicing vehicle; and
the mounts are configured to retain the vehicle location
    unit on a vehicle travelling on an airport.

7. The airport object location system of claim 2, wherein:
the first global positioning satellite antenna is wider than
    the first rail;
the second global positioning satellite antenna is wider
    than the second rail; and
the vehicle location unit further comprises a visibility in
    video that avoids recognition of the vehicle location
    unit by an incursion model created using the dataset.

8. The airport object location system of claim 1, wherein
the receiver is configured to connect to the antenna system
and generate the vehicle location information in a form of
global positioning system data and timestamps.

9. The airport object location system of claim 8, wherein
the antenna system is configured to be removably suctorially
or magnetically attached to a roof of any of the vehicles.

10. The airport object location system of claim 1, wherein
the vehicle location unit further comprises:
    the antenna system and the mounts configured to be
        removably suctorially or magnetically attached to a
        dash of a vehicle; and
    the receiver configured to connect to the antenna system
        and generate the vehicle location information in a form
        of global positioning system data and timestamps.

11. The airport object location system of claim 2, wherein
the reference vehicle comprises one of: a commercial air-
plane, a passenger airplane, a cargo airplane, a tilt-rotor
aircraft, a tilt wing aircraft, a vertical takeoff and landing
aircraft, an unmanned aerial vehicle, a drone, an electric
vertical takeoff and landing vehicle, or a personal air vehicle.

12. The airport object location system of claim 2, wherein
the selected area comprises: a runway, a taxiway, a ramp,
and a helipad.

13. An airport object location system that comprises:
    a number of vehicle location units connected to vehicles,
        wherein each of the vehicles is configured to perform a
        different operation from a remainder of the vehicles and
        the number of vehicle location units are configured to
        generate:
        vehicle location information for the vehicles in an area
            including an operations surface at an airport; and vehicle timestamps for the vehicle location informa-
            tion, wherein each vehicle location unit, respectively,
            comprises:
            an antenna system that comprises:
                a first global positioning satellite antenna affixed
                    at a first end of a first rail;
                a second global positioning satellite antenna
                    affixed at a first end of a second rail; and
                an inertial measurement unit configured to receive
                    and retain a second end of the first rail and to
                    receive and retain a second end of the second
                    rail;
            mounts configured to temporarily suctorially or mag-
                netically connect the first rail and the second rail
                to a vehicle and to be removed for reuse on other
                of the vehicles, wherein the antenna system and
                the mounts when connected together and mounted
                on a surface of any of the vehicles extend 8 inches
                or less from the surface of any of the vehicles;
            a receiver that comprises:
                a network time protocol network time server;
                a global navigation satellite system;
                a gateway configured to transmit location infor-
                    mation; and
            a case that is manually portable, configured to retain
                all components of a vehicle location unit of the
                vehicle location units, and comprises an electrical
                panel that faces an outside of the case on a side of
                the case and is configured to connect electrically
                to:
                the first global positioning satellite antenna;
                the second global positioning satellite antenna;
                the inertial measurement unit;
                an antenna of the network time protocol network
                    time server;
                a battery;
                a universal serial bus port; and
                a display unit port.

14. The airport object location system of claim 13, further
comprising:
    a sensor system connected to a reference vehicle, wherein
        the sensor system is configured to generate real-time
        sensor data for the area, wherein reference timestamps
        and reference location information are associated with
        the real-time sensor data; and
    a model generator configured to correlate the vehicle
        location information for the vehicles with the real-time
        sensor data using the vehicle timestamps, the reference
        location information, and the reference timestamps to
        form a dataset, wherein the model generator is config-
        ured to train a machine learning model to assess
        incursions to a selected operations surface using the
        dataset to form an incursion model, wherein the incur-
        sion model is configured to assess incursions in a
        selected area.

15. The airport object location system of claim 14,
wherein the model generator is configured to:
    create a computer vision model to detect incursions to a
        selected operations surface; and
    test and validate the computer vision model using the
        dataset.

16. The airport object location system of claim 14, further
comprising:
    an incursion assessment system configured to:
        receive current sensor data for the selected area; and assess an incursion into the selected operations surface by a vehicle using the current sensor data and an incursion model created using the dataset.

17. The airport object location system of claim 16, wherein in assessing the incursion into the selected operations surface by the vehicle, the incursion assessment system is configured to:

detect the incursion into the selected operations surface by the vehicle using the current sensor data and the incursion model.

18. The airport object location system of claim 16, wherein the incursion model is further configured to predict that the incursion into the selected operations surface by the vehicle will occur using the current sensor data and the incursion model.

19. The airport object location system of claim 14, wherein the incursion model is selected from at least one of a machine learning model training using the dataset or a computer vision model.

20. The airport object location system of claim 16, wherein the incursion assessment system is configured to:

display the current sensor data on a display system; and associate a graphical indicator with the vehicle in the current sensor data displayed on the display system in response to detecting the incursion.

21. The airport object location system of claim 14, wherein the selected area is one of the area at the airport, a different area at the airport, or another area at another airport.

22. The airport object location system of claim 14, wherein the real-time sensor data is selected from at least one of a video comprising frames, light detection and ranging data, or radar data.

23. The airport object location system of claim 14, wherein the sensor system is selected from at least one of an electro-optical sensor system, a light detection and ranging system, or a radar system.

24. The airport object location system of claim 14, wherein the first global positioning satellite antenna is wider than the first rail;

the second global positioning satellite antenna is wider than the second rail; and each vehicle location unit in the number of vehicle location units comprises a visibility, respectively, in the real-time sensor data that avoids recognition of the vehicle location unit by an incursion model trained using the dataset.

25. The airport object location system of claim 13, wherein each vehicle location unit in the number of vehicle location units is a portable localization data collection system.

26. The airport object location system of claim 13, wherein each vehicle location unit further comprises, respectively, a localization generation unit that comprises the receiver connected to the antenna system, wherein the receiver is configured to process global positioning system signals received by the antenna system and generate the vehicle location information in a form of global positioning system data and timestamps.

27. The airport object location system of claim 26, wherein the antenna system is configured to be removably suctorially or magnetically attached to a roof of the vehicle.

28. The airport object location system of claim 13, wherein a localization generation unit in the number of vehicle location units comprises:

the antenna system and the mounts configured to be temporarily suctorially or magnetically attached to a dash of a vehicle and to be removed and reused on another of the vehicles; and the receiver configured to connect to the antenna system and generate the vehicle location information in a form of global positioning system data and timestamps.

29. A method for detecting an object at an airport, the method comprising:

generating, using a number of vehicle location units connected to vehicles wherein each of the vehicles is configured to perform a different operation from a remainder of the vehicles that comprise different sizes, vehicle location information for the vehicles in an area, including an operations surface at an airport, and vehicle timestamps for locations of the vehicles, wherein each vehicle location unit in the vehicle location units, respectively comprises:

an antenna system that comprises:

a first global positioning satellite antenna affixed at a first end of a first rail;

a second global positioning satellite antenna affixed at a first end of a second rail; and an inertial measurement unit configured to secure to a second end of the first rail and to a second end of the second rail;

mounts configured to connect the first rail and the second rail to a vehicle, wherein the antenna system and the mounts when connected together and mounted on a surface of any of the vehicles extend 8 inches or less from the surface of any of the vehicles;

a receiver that comprises:

a network time protocol network time server;

a global navigation satellite system;

a gateway configured to transmit location information; and a case that is manually portable, configured to retain all components of a vehicle location unit of the vehicle location units, and comprises an electrical panel that faces an outside of the case on a side of the case and is configured to connect electrically to:

the first global positioning satellite antenna;

the second global positioning satellite antenna;

the inertial measurement unit;

an antenna of the network time protocol network time server;

a power source;

a universal serial bus port; and a display unit port;

generating sensor data for the area using a sensor system connected to a reference vehicle;

associating reference timestamps and reference location information to the sensor data, wherein the reference location information is for the reference vehicle; and correlating vehicle location information for the vehicles with the sensor data using the vehicle timestamps, the reference location information, and the reference timestamps to form a dataset.

30. The method of claim 29 further comprising:

each of the vehicles comprising a different size; and training a machine learning model to assess incursions to a selected operations surface using the dataset to form an incursion model, wherein the incursion model assesses incursions by vehicles in a selected area including the selected operations surface.

31. The method of claim 30, further comprising:

integrating the real-time sensor data with real-time kine-matics and achieving an accuracy of location informa-tion for a vehicle of within one centimeter;

receiving current sensor data for the selected area from a new sensor system; and assessing an incursion into the selected operations surface by a vehicle using the current sensor data and the incursion model.

32. The method of claim 31, wherein assessing the incursion into the selected operations surface by the vehicle comprises:

detecting the incursion into the selected operations sur-face by the vehicle using the current sensor data and the incursion model.

33. The method of claim 31, further comprising predicting that the incursion into the selected operations surface by the vehicle will occur using the current sensor data and the incursion model.

34. The method of claim 31, further comprising:

changing a movement of an intruder vehicle in response to detecting the incursion.

35. The method of claim 31, further comprising:

changing a movement of another reference vehicle in response to detecting the incursion.

* * * * *